US007149680B2

(12) United States Patent
Storisteanu et al.

(10) Patent No.: US 7,149,680 B2
(45) Date of Patent: Dec. 12, 2006

(54) SYSTEM AND METHOD FOR PROVIDING LANGUAGE-SPECIFIC EXTENSIONS TO THE COMPARE FACILITY IN AN EDIT SYSTEM

(75) Inventors: Adrian Storisteanu, Toronto (CA); Wesley R. Wardell, Markham (CA)

(73) Assignee: International Business Machines Corporation, Armonk, NY (US)

( * ) Notice: Subject to any disclaimer, the term of this patent is extended or adjusted under 35 U.S.C. 154(b) by 681 days.

(21) Appl. No.: 10/017,059

(22) Filed: Dec. 14, 2001

(65) Prior Publication Data

US 2002/0143522 A1 Oct. 3, 2002

(30) Foreign Application Priority Data

Dec. 15, 2000 (CA) .................................. 2328566

(51) Int. Cl.
*G06F 17/20* (2006.01)
*G06F 9/45* (2006.01)
*G06F 17/28* (2006.01)

(52) U.S. Cl. .......................... 704/1; 717/143; 717/141; 704/4; 704/5; 704/6; 704/8

(58) Field of Classification Search ................ 717/116, 717/141, 143; 707/511, 203, 6, 102; 715/511; 704/1–8

See application file for complete search history.

(56) References Cited

U.S. PATENT DOCUMENTS

| 4,558,413 | A  | * | 12/1985 | Schmidt et al. ............. 707/203 |
| 5,898,836 | A  | * | 4/1999  | Freivald et al. ............ 709/218 |
| 6,182,281 | B1 | * | 1/2001  | Nackman et al. ........... 717/116 |
| 6,236,993 | B1 | * | 5/2001  | Fanberg ........................ 707/6 |
| 6,526,410 | B1 | * | 2/2003  | Aoyama et al. ............. 707/102 |
| 6,596,030 | B1 | * | 7/2003  | Ball et al. ................... 715/511 |
| 6,714,905 | B1 | * | 3/2004  | Chang et al. .................. 704/9 |
| 6,848,078 | B1 | * | 1/2005  | Birsan et al. ............... 715/511 |
| 2002/0120648 | A1 | * | 8/2002 | Ball et al. ................... 707/511 |

OTHER PUBLICATIONS

LPEX Editor User's Guide, IBM, 1998.*

* cited by examiner

*Primary Examiner*—Kakali Chaki
*Assistant Examiner*—Insun Kang
(74) *Attorney, Agent, or Firm*—Martin J. McKinley; Dillon & Yudell LLP

(57) ABSTRACT

An extension of any n-file compare and/or merge utility in an edit system includes services provided by a parser attached to the edit system for the particular file type. A compare command in the edit system is enabled by an extension-registration process to query, upon activation, for any compare extensions supported by the parser. Selected files are displayed to a user with non-comparing elements highlighted according to a compare strategy selected with reference to the compare extensions.

18 Claims, 10 Drawing Sheets

SYSTEM AND METHOD FOR PROVIDING LANGUAGE-SPECIFIC EXTENSIONS TO THE COMPARE FACILITY IN AN EDIT SYSTEM

BACKGROUND OF THE INVENTION

1. Technical Field of the Invention

This invention pertains to editing systems. More particularly, it relates to language-specific extensions to the compare facility in an editing system.

2. Background Art

Regular file compare, carried out by a straightforward comparison of the text elements of a number of files, is not adequate for logical, effective comparison of source files in a manner that will improve the productivity of programmers and assist them during their various code development and code maintenance tasks.

In addition to the options normally provided by compare facilities (e.g., ignore blanks, ignore case), there is a need in the art for a system and method providing language specific requirements.

It is, therefore, an object of the invention to provide a system and method for comparing source files code while ignoring the comments.

It is a further object of the invention to provide a system and method for comparing functions and/or methods defined in source files (names, arguments, etc.), regardless of their detailed implementation.

It is a further object of the invention to provide a system and method for comparing code while ignoring the text located outside margins, in a prefix area, and/or including or excluding sequence numbers, and so forth.

It is a further object of the invention to provide a system and method for comparing source code statement-by-statement, e.g., one-line statement vs. a reformatted statement spread over a number of document lines, effectively ignoring the differences in formatting styles between programmers or coding standards and practices between projects or institutions.

It is a further object of the invention to provide a system and method for comparing constant definitions or keys in, for example, Java resource files, where the values are different (e.g., new constant values or NLS-translated values), in which case the user may still be interested in an indication that the value changed, but does not want to have every line flagged as non-comparing.

It is a further object of the invention to provide a system and method for comparing documents with expected (controlled) differences, such as the change of a class name or a variable name.

It is a further object of the invention to provide a system and method facilitating language-sensitive application of compare options (e.g., ignore case and ignore blanks applied only to language elements and comments, but not to contents of strings).

It is a further object of the invention to provide a system and method for comparing documents in any manner that is advantageous for a specific type of filed handled by the edit system.

SUMMARY OF THE INVENTION

In accordance with the invention, a system and method for the extension of any n-file compare and/or merge utility in an edit system includes services provided by a parser attached to the edit system for the particular file type. A compare command in the edit system is enabled by an extension-registration process to query, upon activation, for any compare extensions supported by the parser.

In accordance with an aspect of the invention, there is provided a computer program product configured to be operable to extend any n-file compare and/or merge utility in an edit system by providing services particular to a specific file type within a parser attached to the edit system for that particular file type.

Other features and advantages of this invention will become apparent from the following detailed description of the presently preferred embodiment of the invention, taken in conjunction with the accompanying drawings.

BEST MODE FOR CARRYING OUT THE INVENTION

In accordance with the preferred embodiment of the invention, the compare command in an edit system is enabled by an extension-registration process to query, upon activation, for any compare extensions supported by the parser attached to the edit system for the currently active files participating in the compare. This allows the parser to add its own compare options, specific to the file type it handles.

In this manner, the compare utility is able to smartly handle differences in content based on the internal structure of the documents, as this is recognized by the parser. Furthermore, the compare utility can in this manner be customized based on the individual parsers abilities, but still in a consistent manner within the edit system.

When these extension options are selected by a user, the parser is invoked to provide one or more specific methods extending those used by the compare utility, such as supplying the (modified) content of the document text (for example, with the comments stripped out, or reformatted to include an entire language statement).

Compare Utility Options

Figure 1:
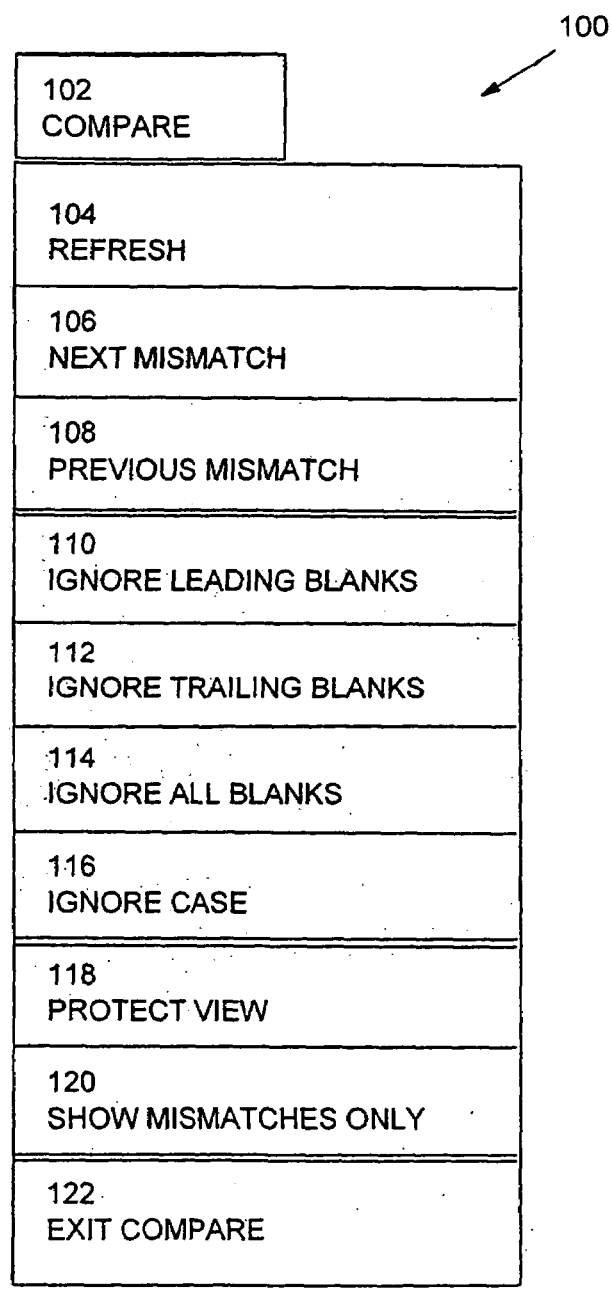
FIG. 1 illustrates a typical pull-down menu for the compare function in an edit system.

Referring to FIG. 1, a typical pull-down menu 100 for the compare function 102 in an edit system is illustrated.

Menu items 104–108 and 118–122 represent compare utility actions which work in the same manner regardless of the language context of the documents being compared.

Refresh 104 refreshes compare after any of the compared documents has been modified. This action 104 redoes the latest compare operation, with the same settings, options, and on the same documents, after the contents of any one or more of these documents has been modified.

Next mismatch 106 results in advancing the cursor to the next mismatch.

Previous mismatch 108 positions the cursor onto the previous mismatch.

Protect view 118 protects the view from editing. If the particular implementation of the compare utility displays n views side-by-side of the documents being compared, this menu action 118 applies to the currently-active view (the one with the focus). If the compare utility shows a composite view of the main document compared to a file or files, then this action prevents the main document from being edited.

Show mismatches only 120 results in displaying only the mismatches.

Exit compare 122 exits the compare utility/mode. If the compare utility displays n views side-by-side of the documents being compared, these views are terminated and disposed. If the compare utility shows a composite view of the main document and the differences to the other documents, then all parser classes, highlights, and other compare-related pertinent information are cleared in this main document view.

Menu items 110–116 are compare options (or equivalently, settings in a Preferences dialog) which may be affected by the type of the compared documents, or that language-specific compare extensions may have to alter. These options 110–116 form part of the compare strategy.

Selection of ignore leading blanks 110 results in leading blanks/white space being removed from text during the comparison.

Ignore trailing blanks 112 results in trailing blanks being removed from text during the comparison.

Ignore all blanks 114 results in all blanks being removed from text during the comparison.

Ignore case 116 results in text being folded to lower/upper case during the comparison.

In accordance with an embodiment of the invention, the parser is able to override any of these compare options 110–116. For example, for ignore all blanks 114, blanks that form part of a C/C++/Java language string should not be ignored: "ABC" is very different from "A B C". In accordance with this aspect of the invention, such new compare options are also added by the parsers.

Edit System

Figure 2:
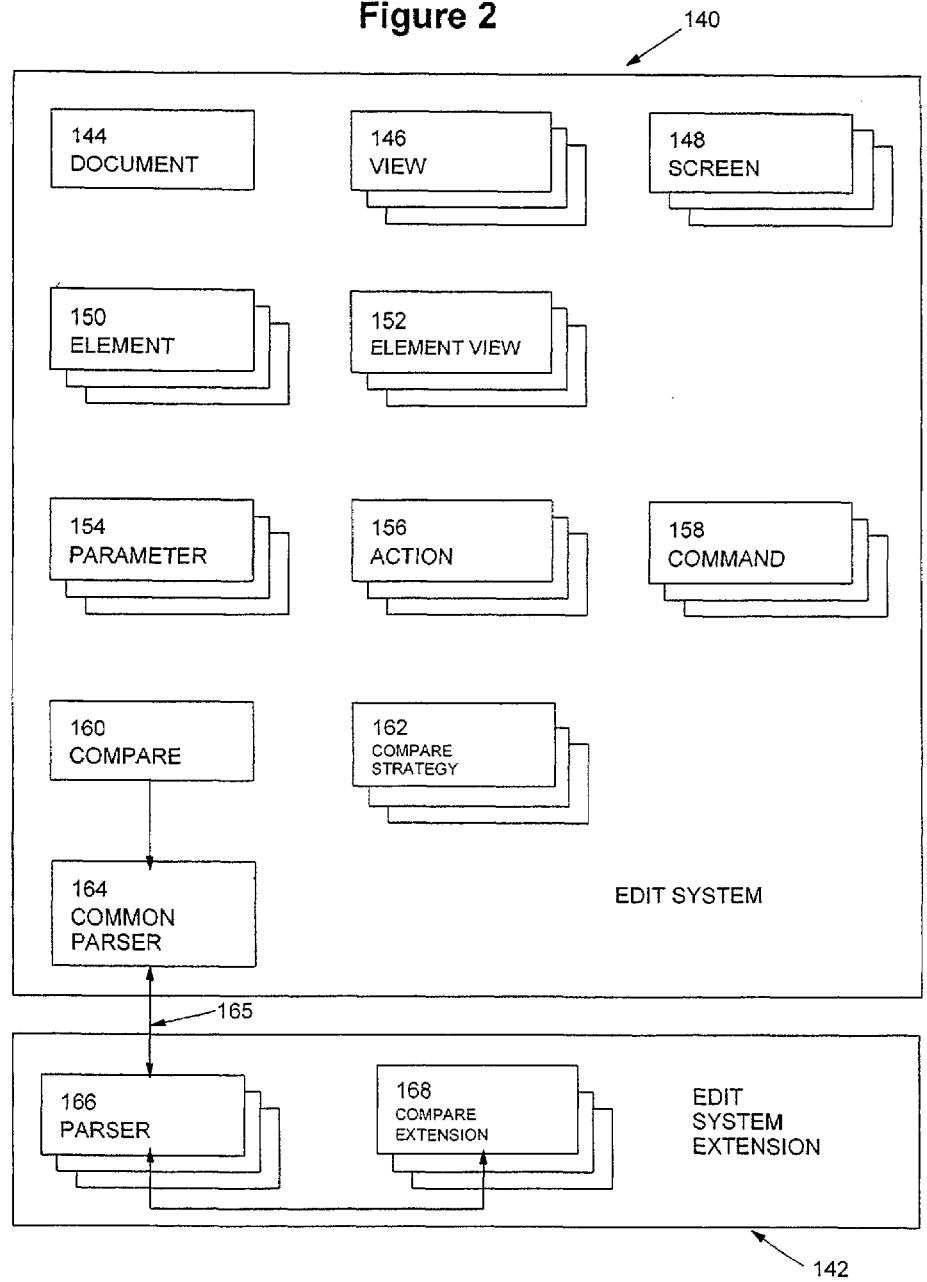
FIG. 2 illustrates the main components of an edit system in accordance with the preferred embodiment of the invention.
Figure 3:
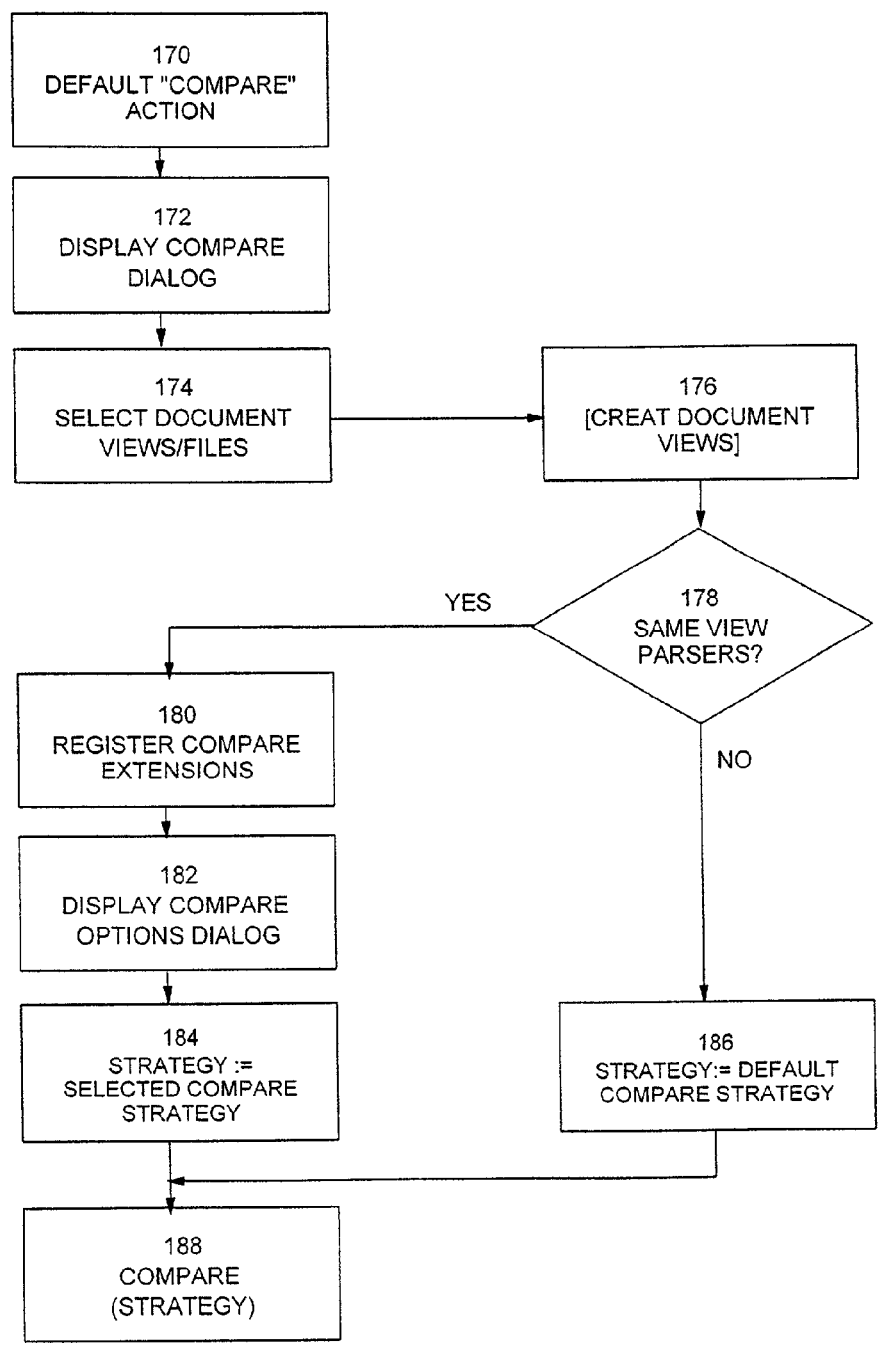
FIGS. 3–6 are flow diagrams illustrating the steps of the preferred embodiment of the invention for invoking a compare utility.
Figure 4:
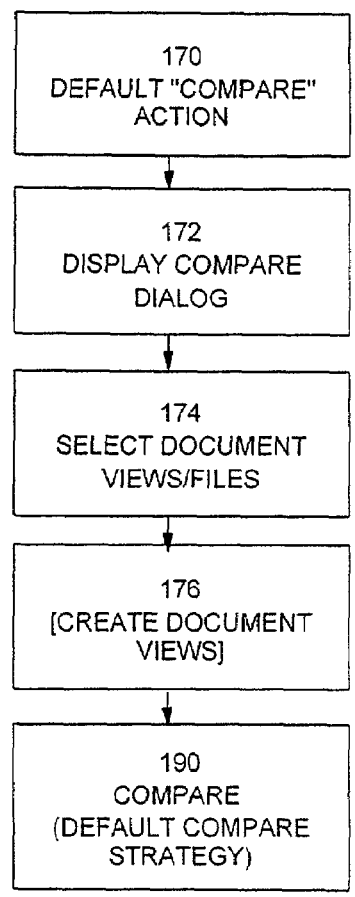

Referring to FIG. 2, the main components of a typical edit system 140 are illustrated, and will be described with particular reference to an embodiment of the system of the invention. Each block shown in edit system 140 represents one or more classes and comprise functions performed by the code in edit system 140, as well as data structures maintained for the documents being edited.

Document class 144 manages one document in the edit system: either a file loaded in the edit system, or a newly-created document. One or more documents 144 may be opened in an edit system session.

View class 146 manages a document view in the edit system 140. There may be several views on the same document open simultaneously in the edit system.

Screen class 148 handles the screen, i.e., the display of the edit window. It manages the display attributes of the rendered elements as set up in view 146 by the edit system and its attached tools—tokenization and colorization of the text as set up by the parsers and other utilities (e.g., the differences marked up by the compare utility in the edit system), the text selection in effect, etc. There is one instance of this class 148 for every document View 146.

Element class 150 manages each text line of document 144. It contains the text of the corresponding line in the document. In addition, show elements may be set in the edit system, which are lines of text displayed in the view of the document but which do not form part of it, and consequently are not saved when the document being edited is saved (e.g., imbedded error messages set up by a build utility, or differences shown by the compare utility). A linked list of elements 150 is maintained for each document 144 in edit system 140.

ElementView class 152 manages the view for one element 150. For each view 146 opened on document 144, and ElementView class 152 corresponding to each element 150 is instantiated. It keeps track of the parser classes and token styles assigned by the language parser(s) and other associated utilities in the view 146, and also contains formatting flags and display attributes.

Parameter class 154 manages a setting of the edit system 140, and provides means for querying and setting of its install, default, and current values, according to its defined scope in the edit system. All the edit system settings are managed by classes extending parameter 154 for the handling of a particular setting.

Action class 156 manages one named action in the edit system.

Command class 158 manages one named command and its arguments.

Compare class 160 in edit system 140 handles the compare command itself and its arguments, and manages the registration and activation of compare extensions 168.

CompareStrategy class 162 provides a set of functions used for a compare operation. A linked list of CompareStrategies is maintained for each active compare session 160.

CommonParser class 164, from which the language parsers derive, implements a set of generic parser services and provides a parser interface to the edit system 140.

Parser class 166 is an edit-system extension which provides document-specific editing functionality.

Compare extension 168 provides document-specific extensions to the Compare utility.

Activities in edit system 140 are triggered by actions and commands. The edit system has a set of built-in (predefined) actions and commands. The system can be customized with user-defined actions and commands, which are new or override built-in (default) actions or commands. Actions can be associated with keys and menus (pull-down, toolbar, pop-up). For example, the "open" action, associated with the key combination "Ctrl+O" and the "Open . . . " item on the "File" pull-down menu, brings up the Open dialog, allowing the user to choose a file to be opened as a document 144 in edit system 140.

Language Parsers

In accordance with the preferred embodiment of the invention, compare utility 160 is extendible through parser interfaces 165.

A language-specific parser 166 is an extension to the edit system 140 which provides a variety of functions which assist users of edit system 140 with their editing tasks. A typical language parser 166 in an edit system 140 reads and analyzes (parses) document 144 contents according to its type; maintains this document information up-to-date throughout its editing; provides token colorization; provides a content-outline of the document; provides code-assist functions; provides automatic formatting of the user input (such as cursor-positioning and text-positioning indentation); provides navigation between classes and tokens, i.e., smart navigation between structural elements of document 144 as identified in a particular view 146 on the document; and provides language-sensitive help on the contents of the document.

Language-specific parsers 166 are attached to the edit system 140 via a file-type association mechanism. For example, the JavaParser class 166 is loaded when a Java source file (*.java or *.jav) is opened in the edit system. A parser 166 first gets control after a file has been loaded in the edit system (to perform an initial total parse), and subsequently it is called following certain edit system events, such as changes made to the document (incremental parse).

Parser 166 analyzes the document, and marks structural elements in it at various degrees of detail. Parser classes are defined for a view 146, that broadly classify element types in the view. Each element 150 can belong to one or more parser classes. For example, text elements 150 which contain comments are marked with parser class CLASS_COMMENT, C-language function header elements with CLASS_FUNCTION, Java-language method signature elements with CLASS_METHOD, etc. Additional classes may be defined by a parser to link consecutive elements that belong to the same language construct (CLASS_FORWARDLINK, CLASS_BACKWARDLINK), to indicate if a text element is empty (CLASS_SPACE), and so on.

More detailed information is recorded by parser 166 via token styles set in the element view 152 for a text element 150. The token style characters identify all the text characters in an element 150, and permit association of the text with display attributes (e.g., an italicized, green-color display and print font style for the comment characters in the element, i.e., those text characters assigned the comment token style).

The set of parsing functions described above is usually implemented on top of any available grammar-parser utility, adapted for use in an edit system and further expanded to support these functions.

The parser-set information is used by the edit system 140 to display the document 144 in a view 146 (colorized, filtered sections of the source, a bounded segment of the source, etc.), by other utilities and tools attached to the edit system to get detailed information about the structure of the document 144 for carrying out context-sensitive actions, and by the parser 166 itself as reference points for incremental parsing and for its other language-specific operations.

Compare Process

Table 1 represents how the compare process in a typical compare utility 160 works. Lines 1–9 indicate the typical settings and functions which may be modified by compare extensions 168. This set of functions is, according to the present invention, defined as a compare strategy. Alternative embodiments of the invention may include additional or other such settings and functions than those indicated here. Compare extensions 168 will modify one or more of these settings and functions in a compare strategy, and consequently modify the compare process for a particular compare operation.

TABLE 1

COMPARE PROCESS

```
for each document view participating in compare
    // build vector of hash values for elements' text
    for all text elements in document view
        text := elementText(element)        1
        if ignoreCase                       2
            text := lowerCase(text)         3
        if ignoreLeadingBlanks              4
            text := stripLeadingBlanks(text)    5
        if ignoreTrailingBlanks             6
            text := stripTrailingBlanks(text)   7
        if ignoreAllBlanks                  8
            text := stripAllBlanks(text)    9
        hashValues[element number] := hash(text)
        elements[element number] := element
    compare the hash-values vectors,
        determine largest blocks that compare,
        mark elements in the document view(s) accordingly,
        set up compare bars to visually summarize differences
            and link comparing blocks.
```

Referring to Table 2, the compare process, as implemented in compare utility 160 according to this invention, will be the same for all compare strategies 162.

TABLE 2

COMPARE PROCESS FOR ALL COMPARE STRATEGIES

```
for each document view participating in compare
    // build vector of hash values for elements' text
    strategy := instance of selected compare strategy for view
    for all text elements in document view
        text := strategy.elementText(element)       1
        if strategy.ignoreCase()                    2
            text := strategy.ignoreCase(text)       3
        if strategy.ignoreLeadingBlanks()           4
            text := strategy.ignoreLeadingBlanks(text)   5
        if strategy.ignoreTrailingBlanks()          6
            text := strategy.ignoreTrailingBlanks(text)  7
        if strategy.ignoreAllBlanks()               8
            text := strategy.ignoreAllBlanks(text)  9
        hashValues[element number] := hash(text)
        elements[element number] := element
    compare the hash-values vectors,
        determine largest blocks that compare,
        mark elements in the document view(s) accordingly,
        set up compare bars to visually summarize differences
            and link comparing blocks.
```

Invocation of the Compare Utility

Referring to FIGS. 3–6, when in step 170 the default "compare" action 160 is invoked in the edit system 140, in step 172 a compare dialog is displayed, which allows the user in step 174 to select the compare entities; for example, the existing document views 146 to compare or, depending on the edit system implementation, to select the file(s) with which to compare the currently active document view 146, for which file( ) document view(s) are instantiated in step 176.

Once the selected compare views 146 are determined (and optionally created for the selected file(s) not currently opened in the edit system), compare utility 160 can in step 178 establish whether the attached parsers 164 and 166 are identical, and consequently is able in step 180 to initiate the compare-extension 168 registration process. Depending on the desired embodiment, in step 180 the compare-extension 168 registration may now be invoked, and in step 182 the user is presented another dialog with the new compare options registered to select the desired option. Alternatively, the compare can proceed in step 190 with the default compare action in accordance with the default options in effect; subsequently, the user can in step 192 select the compare menu pull-down, whose creation in step 194 will trigger in steps 178 and 180 the registration process, and in steps 182 and 196 the compare menu will be populated with the additional compare options registered for execution in steps 184 and 188.

Figure 6:
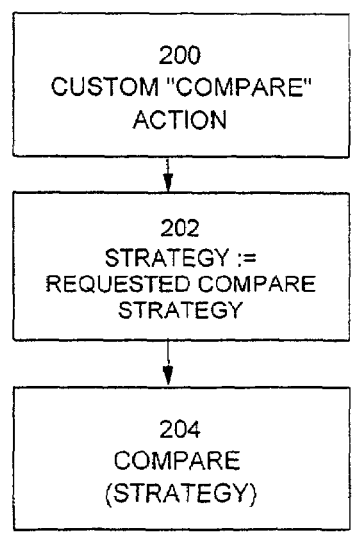
Figure 5:
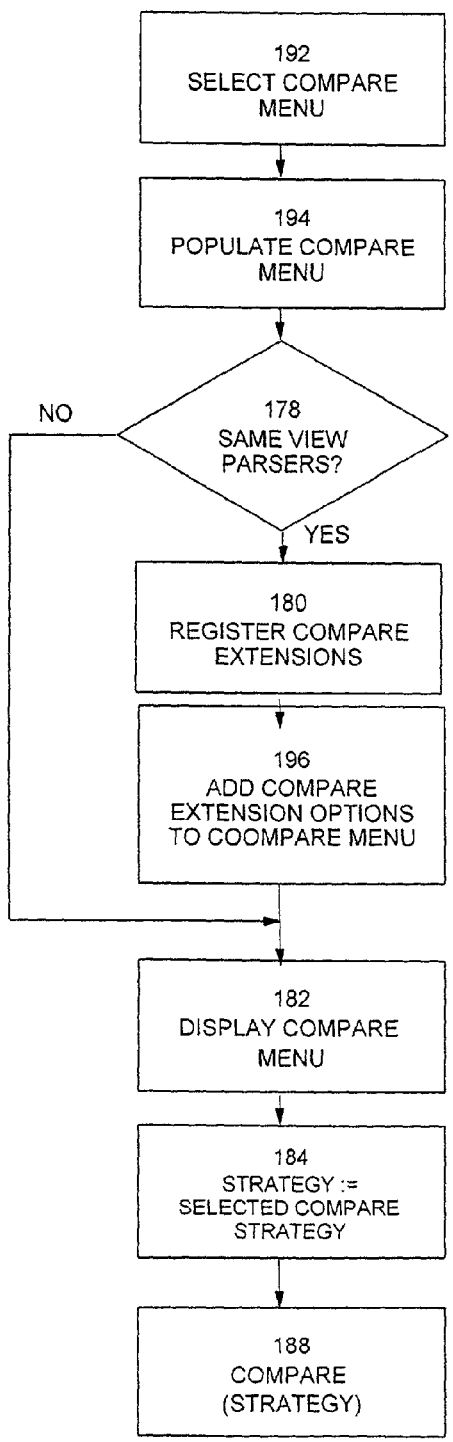

Referring to FIG. 6, other "compare" actions 200 can be defined programmatically in the edit system 140, which will invoke in steps 202 and 204 the compare utility 160 directly with a certain compare-extension strategy.

Registration of Compare Extensions

Figure 7:
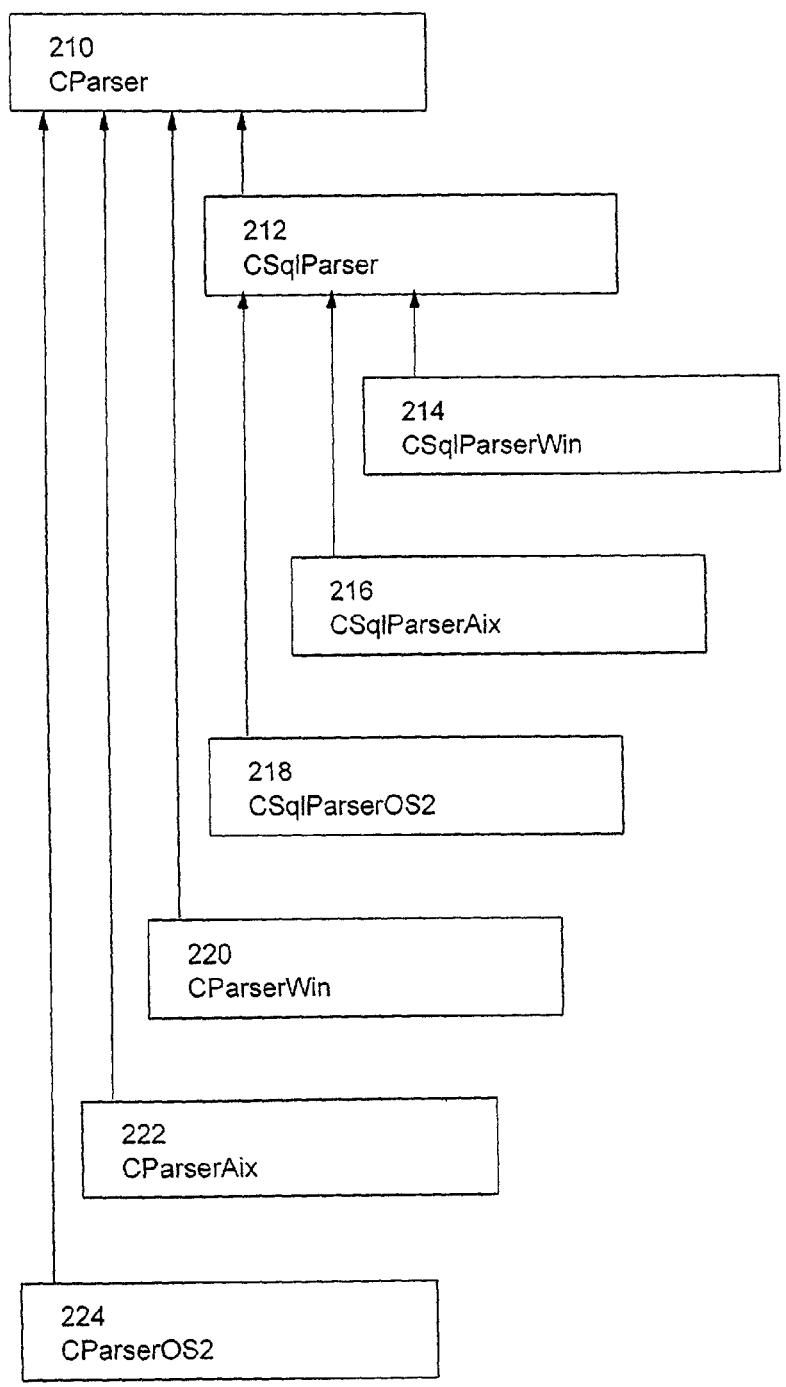
FIG. 7 illustrates an aspect of the registration of compare extensions.

Referring to FIG. 7, compare utility 160 calls the parser 166 to register any compare-extensions 168 whenever all the documents 144 participating in the compare/merge have the same parser 166. Similarly, this is done for extensions 168 registered by parsers extending the same base parser 166. For example, parsers 212–224 for various flavors of the C language for different platforms (such as Windows, AIX, and OS2), all extend a base C-language parser 210. As a consequence, documents 144 handled by any combination of these parsers 212–224 can participate in the compare extensions 168 registered by the basic CParser 210.

The registration process is initiated by the Compare utility 160 calling a CommonParser 164 entry point registerCompareExtensions( ) to allow the parser for the document view 146 to register its compare strategies 162, if any, such as a parser default strategy and/or additional strategies for extra compare options. This is accomplished by the parser 166, which extends CommonParser 164 and overrides registerCompareExtensions( ) if it has any compare extensions 168 to register, to call in turn the Compare utility 160 entry point registerstrategy( ) for each compare extension 168 it wants to register.

The Compare class 160 adds each compare strategy 162 indicated via the registerStrategy( ) calls to its linked list of strategies for the current compare session. When it is returned control from registerCompareExtensions( ), it is able to go through the compareStrategiesList just created, and query each registered strategy for the compare option to display to the user, and create an edit-system action for each such option (e.g., menu item, checkbox, etc.).

When the user selects a particular compare option, the defined action is run, which in turn calls the compare process 160 with the associated compare strategy 162.

Compare Strategy

Each compare extension 168 implements a compare strategy, i.e., implements the compare-utility callback extendible methods, which either override, or extend compare-utility 160 methods, or call super( ) (the parent-class method) to effectively change nothing in the Compare utility default strategy (when the method is not altered by the particular compare extension 168).

Through this method-extension mechanism, various other compare details may be implicitly modified as pertinent to the option selected (e.g., turning on by default the "ignore blanks" setting, so as to ignore any blanks outside the language constructs when ignoring comments in the comparison).

Table 3 illustrates a typical base CompareStrategy class as implemented in the compare utility 160 of edit system 140.

It defines the default compare strategy 162 for the basic compare options defined in the edit system.

TABLE 3

COMPARE

CompareStrategy
---------------
---------------

```
/**
 * This class consists of methods for a compare-command action.
 * The implementation of this class provides the default strategy
 * for a compare action.
 * Parsers may extend this class to override or extend methods,
 * in order to create their default strategy, or a compare strategy
 * for a language-specific compare extension.
 */
public class CompareStrategy
{
    // keep a reference to the compare view using this strategy
    protected View _view;
    /**
     * Constructor for this compare strategy.
     * It instantiates the strategy for a particular compare view.
     */
    public CompareStrategy(View view)
    {
        _view = view;
    }
    /**
     * Retrieve the compare view of this strategy instance.
     */
    public View view()
    {
        return _view;
    }
    /**
     * Retrieve the name of the compare option implemented through this
     * strategy.
     * The implementation of this method in the default compare strategy
     * does nothing, except return null. The parser implementing a
     * particular strategy for a compare option should override this
     * method to return a string suitable for display as a compare-option
     * menu item.
     */
    public String compareOptionName()
    {
        return null;
    }
    /**
     * Query whether differences in the character case of the compared
     * text are significant.
     * The implementation of this method in the default compare strategy
     * returns the currently effective setting of the "compare.ignoreCase"
     * edit-system parameter for this compare view.
     */
    public boolean ignoreCase()
    {
        return Compare.ignoreCaseParameter().currentValue(_view);
    }
    /**
     * Return a case-neutral variation of the text passed in.
     * The implementation of this method in the default compare strategy
     * returns the lower-case version of the entire submitted string.
     */
    public String ignoreCase(String text)
    {
        return lowerCase(text);
    }
    /**
     * Query whether the compare operation should ignore leading
     * blanks in the compared text.
     * The implementation of this method in the default compare strategy
     * returns the current setting of the "compare.ignoreLeadingBlanks"
     * edit-system parameter for this compare view.
     *
     */
```

TABLE 3-continued

COMPARE

```
public boolean ignoreLeadingBlanks()
{
    return Compare.ignoreLeadingBlanksParameter().currentValue
        (_view);
}
/**
 * Return a no-leading-blanks variation of the text passed in.
 * The implementation of this method in the default compare strategy
 * returns the submitted text with any leading white space stripped.
 */
public String ignoreLeadingBlanks(String text)
{
    return stripLeadingBlanks(text);
}
/**
 * Query whether the compare operation should ignore trailing blanks
 * in the compared text.
 * The implementation of this method in the default compare strategy
 * returns the current setting of the "compare.ignoreTrailingBlanks"
 * edit-system parameter for this compare view.
 */
public boolean ignoreTrailingBlanks()
{
    return Compare.ignoreTrailingBlanksParameter().currentValue
        (_view);
}
/**
 * Return a no-trailing-blanks variation of the text passed in.
 * The implementation of this method in the default compare strategy
 * returns the submitted text with any trailing white space stripped.
 */
public String ignoreTrailingBianks(String text)
{
    return stripTrailingBlanks(text);
}
/**
 * Query whether the compare operation should ignore blank
 * characters (white space) in the compared text.
 * The implementation of this method in the default compare strategy
 * returns the current setting of the "compare.ignoreAllBlanks"
 * edit-system parameter for this compare view.
 *
 */
public boolean ignoreAllBlanks()
{
    return Compare.ignoreAllBlanksParameter().currentValue(_view);
}
/**
 * Return a no-blanks variation of the text passed in.
 * The implementation of this method in the default compare strategy
 * returns the submitted text with any white space stripped.
 */
public String ignoreAllBlanks(String text)
{
    return stripAllBlanks(text);
}
/**
 * Retrieve the text of an element in the document, which will be used
 * in the compare process.
 * The parser implementing a particular compare strategy may
 * override this method to return an altered string of the actual text
 * element content (e.g., with the comments stripped for an "Ignore
 * comments" compare option).
 */
```

TABLE 3-continued

COMPARE

```
public String elementText(int element)
{
    // retrieve element
    Element e = view.elementAt(element);
    // valid element - return its text
    if (e != null) {
        return e.text();
    }
    // element not available - return null
    else {
        return null;
    }
}
```

Compare Extension

Compare utility 160 loads and invokes the particular parser class when the user selects an extension option. The compare utility then runs in the usual manner, however certain of its methods are now handled by the parser 166 for the particular type of document and compare option.

Compare strategies can be implemented either in the parser 166 itself, or in the common parser 164 for more generic compare options (such as "Ignore comments"), with the language-specific methods further implemented in the language parsers 166.

Figure 8:
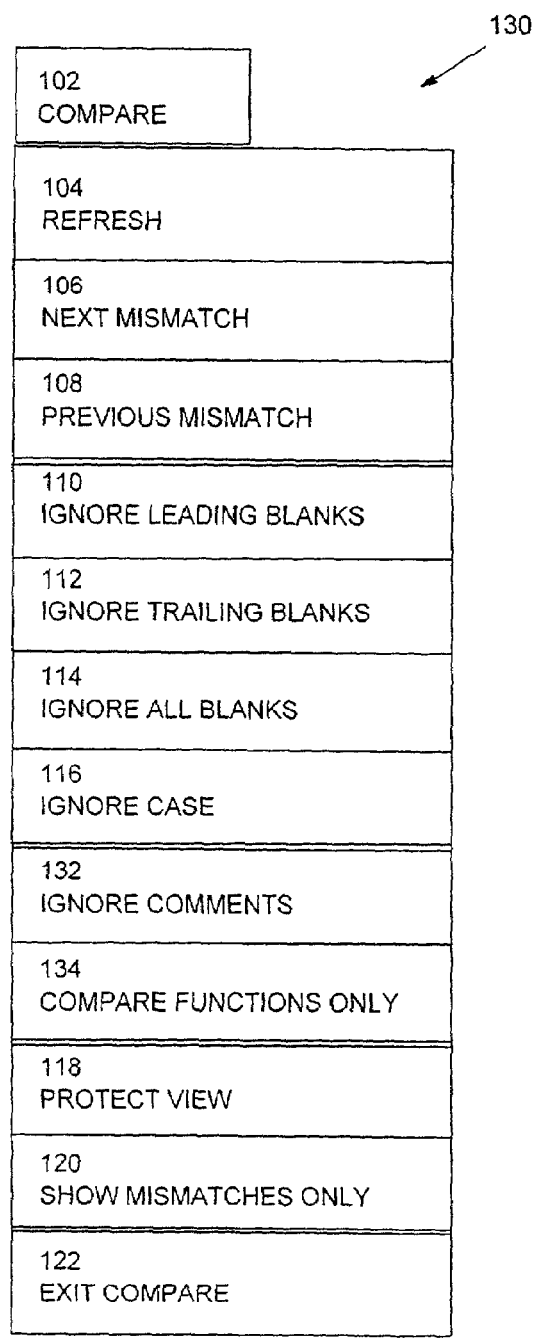
FIG. 8 illustrates a pull-down menu for the compare function in an edit system including, for example, two extended compare options.

Referring to FIG. 8, there are two extensions 132, 134 provided to the edit system compare utility for C documents. The C language parser 166, in conjunction with the Common Parser 164, effectively implements both these CompareStrategy extensions, overriding or extending one or more methods in the default CompareStrategy class, for the compare options "Ignore comments" 132 and "Compare functions only" 134. FIG. 8 illustrates the modified Compare menu pull-down of FIG. 1 after the addition of these two extensions 168.

The two additional compare options 132,134 are added to the compare menu 130 during the compare-extension registration process.

Figure 9:
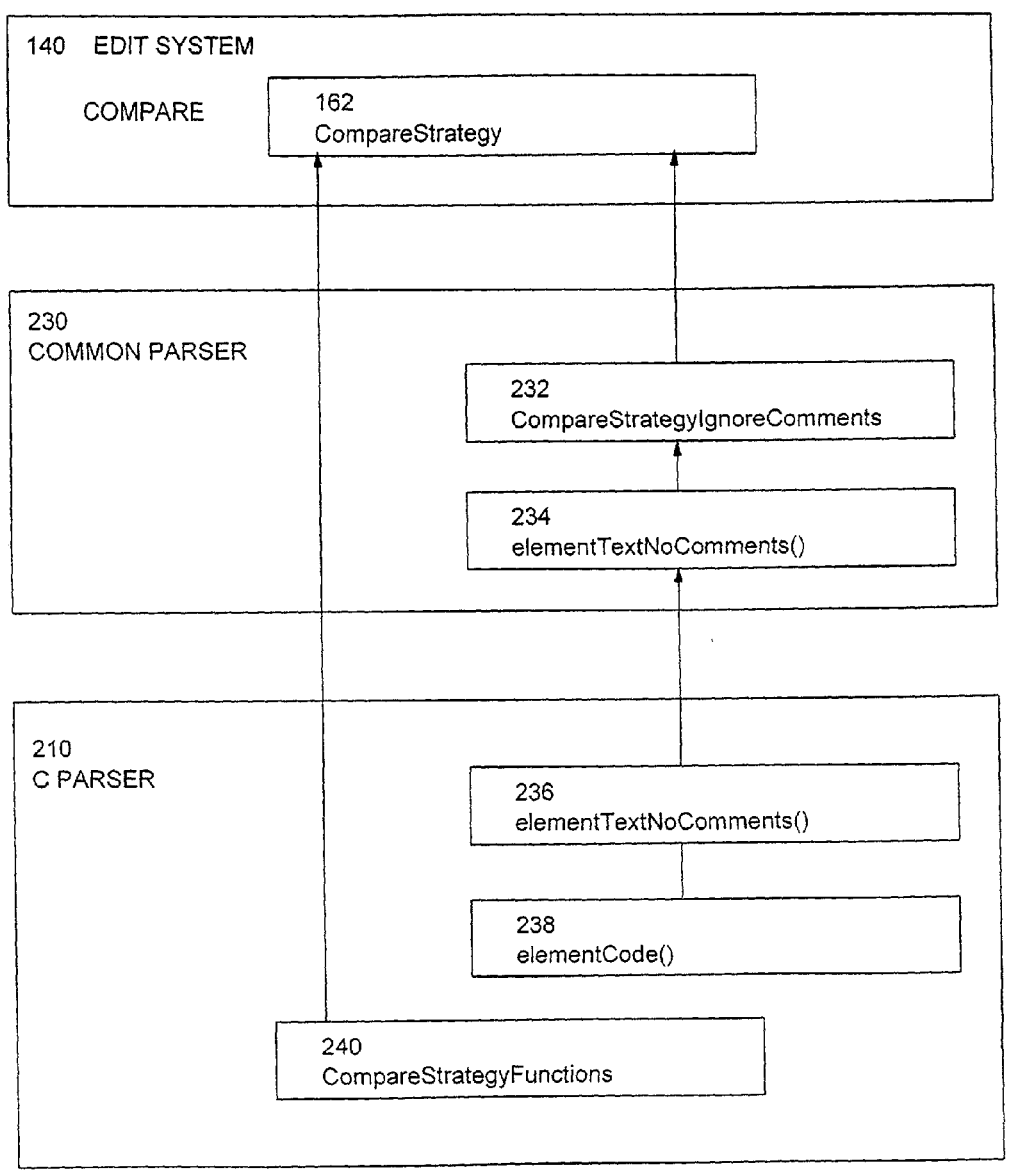
FIG. 9 illustrates components of an edit system implementing the two extended compare options of FIG. 8.

Referring to FIG. 9, a preferred implementation of the edit system of these two compare extensions 132, 134 is illustrated. In this example, common parser 230 corresponds to common parser 164, and includes the compare strategy 162 for option "Ignore comments" CompareStrategyIgnoreComments 232, and procedure elementsTextNoComments( ) 234. C parser 210 corresponds to parser 166, and includes procedure elementTextNoComments( ) 236 which overrides procedure elementTextNoComments( ) 234 in the common parser 230, procedure elementCode( ) 238, and compare strategy 162 for option "Compare functions only" CompareStrategyFunctions 240.

The methods not implemented in the extension strategy classes below will activate, when invoked during the comparison, the original methods in the base CompareStrategy class (the default compare strategy 162 is illustrated in Table 3):

TABLE 4

COMPARE EXTENSION

COMMON PARSER:
CompareStrategyIgnoreComments
----------------------------
----------------------------
```
/**
    * This compare strategy consists of methods for the compare-
    * command "Ignore comments" action. It extends the default
    * Compare strategy. Only methods that are different from the
    * default CompareStrategy are implemented in here.
    *
    * This compare extension is registered with Compare for all parsers
    * that support stripping of comments from the element text.
    */
public class CompareStrategyIgnoreComments extends CompareStrategy
{
    /**
    * Invoke the constructor of the default compare strategy.
    */
    public CompareStrategyIgnoreComments(View view)
    {
        super(view);
    }
    /**
    * Return the name of the compare option implemented through this
    * strategy.
    */
    public String compareOptionName()
    {
        return "Ignore comments";
    }
    /**
    * Indicate that the compare operation should ignore blank characters
    * (white space) in the compared text.
    * Once comments are stripped from the element text, it's important
    * to ignore the left-over blank characters, regardless of the manner
    * in which the parser removes the comments.
    */
    public boolean ignoreAllBlanks()
    {
        return true;
    }
    /**
    * Retrieve the text of an element in the document, which will be used
    * in the compare process. All the comments are stripped.
    */
    public String elementText(int element)
    {
        // invoke the call-back (hook) which the parser extends in
        // order to carry out the actual comment-removal
        return elementTextNoComments(element);
    }
}
elementTextNoComments(element)
------------------------------
/**
    * This method is part of the Common Parser interface.
    * A parser may override this method to return the text of an element
    * with the comments stripped out.
    *
    * The implementation of this method in the Common Parser returns
    * the complete text ('as is') of the element.
    * @param element - element in the document
    */
    String elementTextNoComments(int element)
    {
        return view.elementText(element);
    }
C PARSER:
    CompareStrategyFunctions
    ------------------------
    ------------------------
    /**
    * This compare strategy consists of methods for the compare-
    * command "Compare functions only" action. It extends the default
    * Compare strategy. Only methods that are different from the default
    * CompareStrategy are implemented in here.
    */
```

TABLE 4-continued

COMPARE EXTENSION

```
public class CompareStrategyFunctions extends CompareStrategy
{
    /**
     * Invoke the constructor of the default compare strategy.
     */
    public CompareStrategyFunctions(View view)
    {
        super(view);
    }
    /**
     * Return the name of the compare option implemented through this
     * strategy.
     */
    public String compareOptionName()
    {
        return "Compare functions only";
    }
    /**
     * Retrieve the text of an element in the document, which will be used
     * in the compare process. Only function-header elements are
     * returned; no other elements participate in the compare process.
     */
    public String elementText(int element)
    {
        if (element >0) {
            // check that the parser has set the CLASS_FUNCTION
            // parser class for this element
            if ((view.elementClasses(element) & classFunction) != 0) {
                // if function header, return element's text
                return view.elementText(element);
            }
        }
        // not a function-header element
        return null;
    }
}
elementTextNoComments(element)
-----------------------------
/**
 * Retrieve the text of a document's element without the comments.
 * Overrides the generic call-back method defined in Common Parser.
 * @param element - element in the document
 */
String elementTextNoComments(int element)
{
    if (element >0) {
        return elementCode(element); // see method below
    }
    else {
        return null;
    }
}
elementCode(element)
--------------------
/**
 * Retrieve the code (comments stripped) of an element.
 * The comment characters, established as such by the parser, are
 * blanked out in the returned string.
 *
 * For example, for this line of C code:
 *    int i = 10 /* a reasonable constant */ + j; // init.i
 * the parser will have set this style string:
 * Kkk__I__O__Nn__Cccccccccccccccccccccccccc__O__IP__Ccccccccc
 * and this method will return the string below:
 *    int i = 10             +j;
 * An alternative implementation of this method could strip, rather
 * replace with blanks, the comment characters, returning:
 *    int i = 10 +j;
 *
 * @param element - element in the document
 */
String elementCode(int element)
{
    // style characters used by the parser to mark comments
    String commentStyles = "Cc";
    // retrieve this element's style string
    String style = view.elementStyle(element);
```

TABLE 4-continued

COMPARE EXTENSION

```
        // retrieve this element's text
        String Buffer code = new String Buffer(view.elementText(element));
        // establish the valid range of the element text/style to process
        int i = style.length();
        if (code.length() <i) {
            i = code.length();
            }
    // blank out all comment characters in the element's text
    while (--i >= 0) {
        if (commentStyles.indexOf(style.charAt(i)) >= 0) {
            code.setCharAt(i, ' ');
            }
        }
    // return resulting string
    return code.toString();
}
```

EXAMPLE

Figure 10:
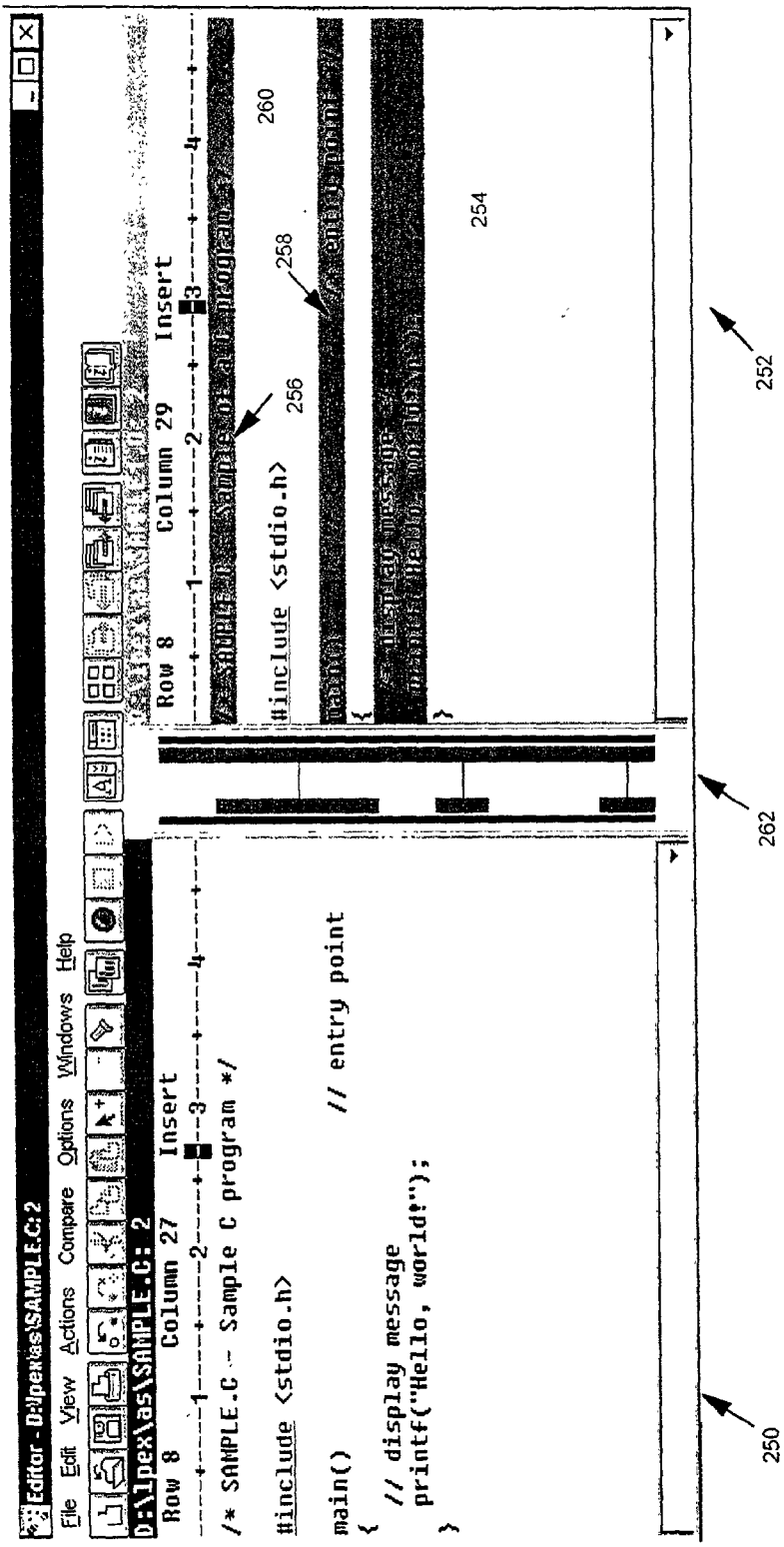
FIG. 10 is a screen capture illustration of a regular compare of two C-language documents.
Figure 11:
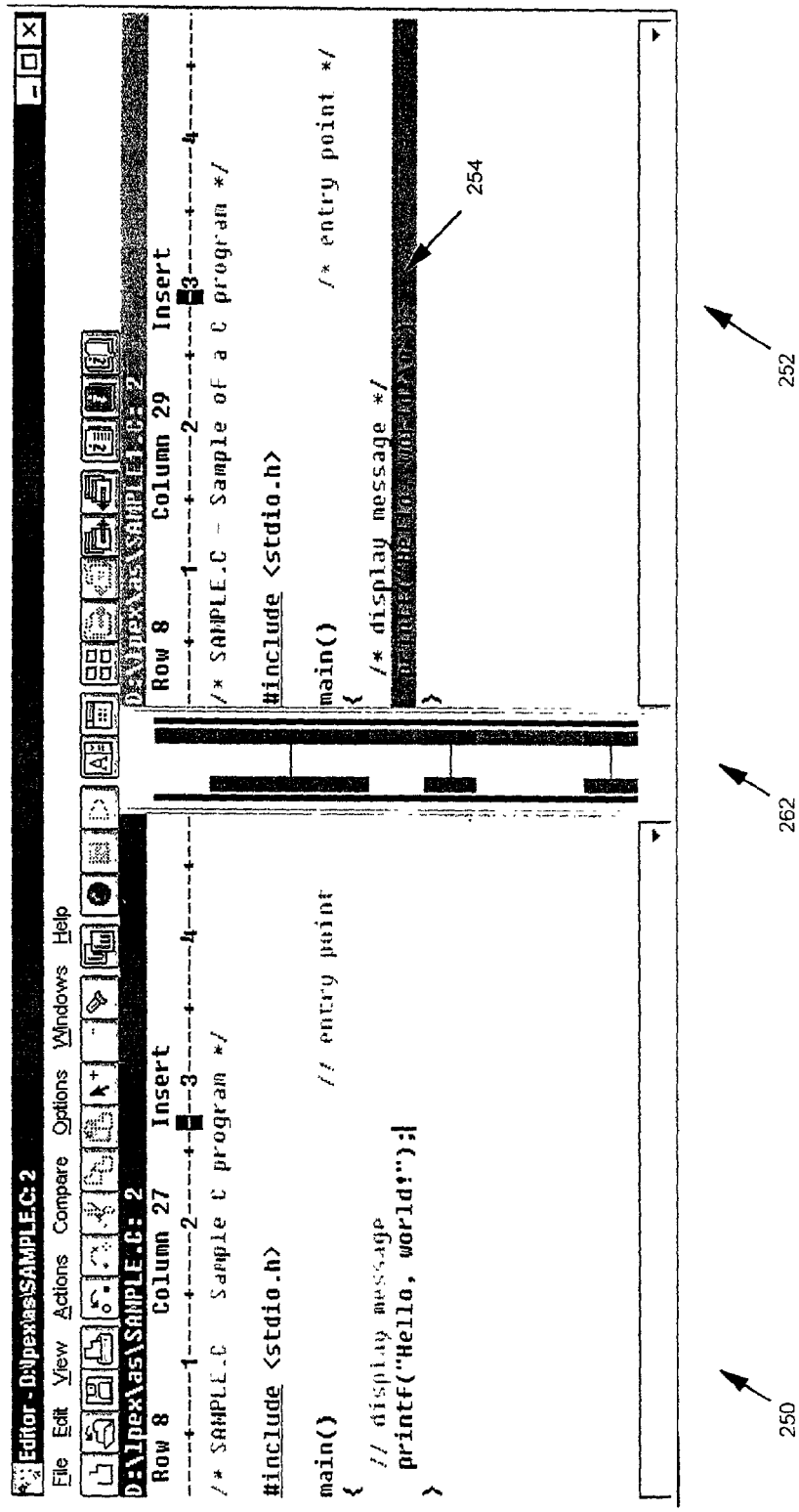
FIG. 11 is a screen capture illustration of a compare of the two C-language documents of FIG. 10 according to the present invention.

Referring to FIGS. 10 and 11, an example illustrating comparisons of two C-language documents is shown. As illustrated in FIG. 10, the differences between the two documents 250 and 252 consist of one actual code change at 254, and a series of documentation (comments) changes at 256, 258 and 260. As illustrated in FIG. 11, when the menu option "Ignore comments" 132 is selected, the compare only highlights the actual code changes at 254, clearing in FIG. 11 the cluttered display of FIG. 10 from all the compare information 256, 258, 260 which is not pertinent. The compare extension 168 in this case is implemented in the C parser 210, an embodiment of parser 166. C parser 210 strips the comments (all text identified by the COMMENT class and comment style characters in the total and incremental parse operations) when supplying the text to the compare utility 160. As a result, the line-by-line comparison taking place after the hash operation will see these lines as effectively identical.

The user may be optionally informed of further differences existing between the compared documents, beyond the ones highlighted, through various means, such as (1) a message on the status line; or (2) keeping all the differences present in the compare bars 262 located between the edit views 250, 252. This option can be implemented by carrying out the compare procedure for the compare bars 262 between the views using the default compare strategy (or the parser default strategy, or a variation of it), and for the highlights 254 inside the views using the compare extension's registered strategy. Or, (3) other similar means, depending on the particular implementation.

Advantages over the Prior Art

It is, therefore, an advantage of the invention that there is provided a system and method for comparing source files code while ignoring the comments.

It is a further advantage of the invention that there is provided a system and method for comparing functions and/or methods defined in source files (names, arguments, etc.), regardless of their detailed implementation.

It is a further advantage of the invention that there is provided a system and method for comparing code while ignoring the text located outside margins, in a prefix area, and/or including or excluding sequence numbers, and so forth.

It is a further advantage of the invention that there is provided a system and method for comparing source code statement-by-statement, e.g., one-line statement vs. a reformatted statement spread over a number of document lines, effectively ignoring the differences in formatting styles between programmers or coding standards and practices between projects or institutions.

It is a further advantage of the invention that there is provided a system and method for comparing constant definitions or keys in, for example, Java resource files, where the values are different (e.g., new constant values or NLS-translated values), in which case the user may still be interested in an indication that the value changed, but does not want to have every line flagged as non-comparing.

It is a further advantage of the invention that there is provided a system and method for comparing documents with expected (controlled) differences, such as the change of a class name or a variable name.

It is a further advantage of the invention that there is provided a system and method facilitating language-sensitive application of compare options (e.g., ignore case and ignore blanks applied only to language elements and comments, but not to contents of strings).

It is a further advantage of the invention that there is provided a system and method for comparing documents in any manner that is advantageous for a specific type of filed handled by the edit system.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, PI/1 or the like. And still further, each said step, or a file or object or the like implementing each said step, may be executed by special purpose hardware or a circuit module designed for that purpose.

Accordingly, the scope of protection of this invention is limited only by the following claims and their equivalents.

The embodiments of the invention in which an exclusive property or privilege is claimed are defined as follows:

1. A method comprising:
   selecting at least two documents for comparison, wherein the at least two documents contain source code written in at least one programming language;
   identifying the at least one programming language as being utilized in the at least two documents;
   in response to the identifying, associating a respective parser to each of the at least two documents, wherein each respective parser is tailored to parse documents that utilize a specific programming language;
   determining whether all associated parsers are of a same type;
   in response to determining that all associated parsers are of the same type, selecting and applying either a default compare strategy or a custom compare strategy when comparing the at least two documents; displaying the result of the comparing; and
   in response to determining that not all associated parsers are of the same type, applying the default compare strategy; displaying the result of the comparing.

2. The method according to claim 1, further comprising:
   in response to selecting the custom compare strategy when comparing the at least two documents, selecting at least one compare option to be utilized in the custom compare strategy.

3. The method according to claim 1, further comprising:
   in response to selecting the custom compare strategy when comparing the at least two documents, displaying a compare dialog for selecting at least one compare option to be utilized in the custom compare strategy.

4. The method according to claim 1, wherein the respective parser reads and analyzes documents according to file type, maintains document information throughout document editing, provides token colorization, provides a content-outline of the document, provides code-assist functions, provides automatic formatting of user input, provides navigation between classes and tokens, and provides language-sensitive help on contents of the document.

5. The method according to claim 1, wherein the comparison is performed while ignoring comments.

6. The method according to claim 1, wherein the comparison anticipates expected differences between the at least two documents including a change of a class or a variable name.

7. A computer-readable medium storing a computer-program product, comprising instructions for: selecting at least two documents for comparison, wherein the at least two documents contain source code written in at least one programming language;
   identifying the at least one programming language as being utilized in the at least two documents;
   in response to the identifying, associating a respective parser to each of the at least two documents, wherein each respective parser is tailored to parse documents that utilize a specific programming language;
   determining whether all associated parsers are of a same type;
   in response to determining that all associated parsers are of the same type, selecting and applying either a default compare strategy or a custom compare strategy when comparing the at least two documents; displaying the result of the comparing; and
   in response to determining that not all associated parsers are of the same type, applying the default compare strategy; displaying the result of the comparing.

8. The computer-readable medium according to claim 7, storing a computer-program product, further comprising instructions for:
   in response to selecting the custom compare strategy when comparing the at least two documents, selecting at least one compare option to be utilized in the custom compare strategy.

9. The computer-readable medium according to claim 7, storing a computer-program product, further comprising instructions for:
   in response to selecting the custom compare strategy when comparing the at least two documents, displaying a compare dialog for selecting at least one compare option to be utilized in the custom compare strategy.

10. The computer-readable medium according to claim 7, wherein the computer program product further includes instructions for:
    reading and analyzing documents according to file type;
    maintaining document information throughout document editing;
    providing token colorization;
    providing a content-outline of the document;
    providing code-assist functions;
    providing automatic formatting of user input;
    providing navigation between classes and tokens; and
    providing language-sensitive help on contents of the document.

11. The computer-readable medium according to claim 7, storing a computer program product, wherein the instructions for the comparison is performed while ignoring comments.

12. The computer-readable medium according to claim 7, storing a computer program product wherein the instructions for the comparison anticipates expected differences between the at least two documents including a change of a class or a variable name.

13. A data processing system comprising:
    at least one processor;
    a system memory coupled to said processor, said system memory storing a computer program product including instructions for:
    selecting at least two documents for comparison, wherein the at least two documents contain source code written in at least one programming language;
    identifying the at least one programming language as being utilized in the at least two documents;
    in response to the identifying, associating a respective parser to each of the at least two documents, wherein each respective parser is tailored to parse documents that utilize a specific programming language;
    determining whether all associated parsers are of a same type; in response to determining that all associated parsers are of the same type, selecting and applying either a default compare strategy or a custom compare strategy when comparing the at least two documents; displaying the result of the comparing; and
    in response to determining that not all associated parsers are of the same type, applying the default compare strategy;displaying the result of the comparing.

14. The data processing system according to claim 10, wherein the computer program product further comprises instructions for:

in response to selecting the custom compare strategy when comparing the at least two documents, selecting at Least one compare option to be utilized in the custom compare strategy.

15. The data processing system according to claim 10, wherein the computer program product further comprises instructions for:

in response to selecting the custom compare strategy when comparing the at least two documents, displaying a compare dialog for selecting at least one compare option to be utilized in the custom compare strategy.

16. The data processing system according to claim 10, wherein the computer program product further comprises instructions for:

reading and analyzing documents according to file type;
maintaining document information throughout document editing;
providing token colorization;
providing a content-outline of the document;
providing code-assist functions;
providing automatic formatting of user input
providing navigation between classes and tokens; and
providing language-sensitive help on contents of the document.

17. The data processing system according to claim 10, storing a computer program product, wherein the instructions for the comparison is performed while ignoring comments.

18. The data processing system according to claim 10, wherein the comparison anticipates expected differences between the at least two documents including a change of a class or a variable name.

* * * * *